Aug. 27, 1963

W. A. CHARBONNEAUX 3,102,233

GALVANOMETER WITH DISCRETE LIQUID GLOBULE DAMPING MEANS

Filed July 14, 1961

INVENTOR.
WILSON A. CHARBONNEAUX
BY
*Alfred W. Petschaft*
ATTORNEY

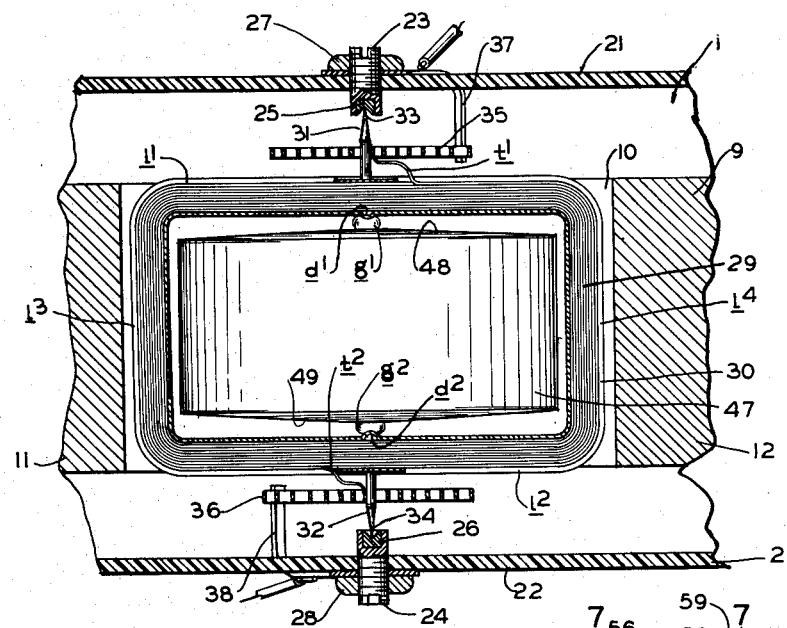
FIG. 5
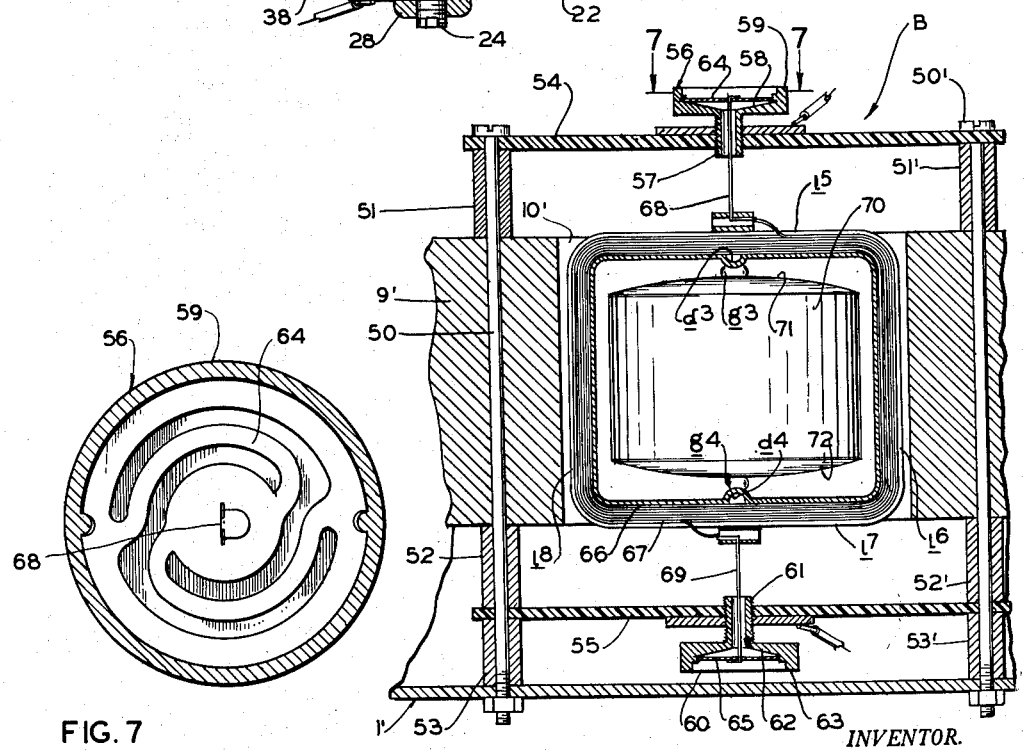
FIG. 7
FIG. 6

United States Patent Office 3,102,233
Patented Aug. 27, 1963

3,102,233
GALVANOMETER WITH DISCRETE LIQUID GLOBULE DAMPING MEANS
Wilson A. Charbonneaux, Dayton, Ohio, assignor to WacLine, Inc., Dayton, Ohio, a corporation of Ohio
Filed July 14, 1961, Ser. No. 124,048
14 Claims. (Cl. 324—125)

This invention relates in general to electrical indicating instruments and, more particularly, to moving coil assemblies in magnetic fields.

In many volt meters, ammeters, ohm meters, and other types of galvanometers and other indicating instruments, a moving coil is rotatably mounted within a magnetic field. This coil is usually mounted on some pivot point by means of bearings or is suspended from a taut band or wire. Since friction resulting from the means of coil-suspension will introduce serious error, every effort must be made to eliminate such friction. However, when the means of coil-suspension is as frictionless as possible, the coil swings very fully and becomes highly susceptible to shock, vibration, and overswing. In fact, damping problems become increasingly more acute as the amount of friction in the coil-bearings is reduced.

Normally, damping of such a moving assembly is accomplished by one of four methods. First, and most generally used, is an aluminum winding-form which acts as a shorted turn in which the induced current tends to oppose the rotation of the coil in the magnetic field. Secondly, the windings of the coil are sometimes partially shorted externally to provide a counter electromotive force which tends to retard rotation. A third method is to use an aluminum disk or segment which moves through the air gap of a strong magnetic field. The induced eddy currents in the disk oppose rotation in proportion to speed. The fourth method is to use a light vane in an air chamber which acts as a dash-pot to retard motion.

It is, therefore, one of the primary objects of the present invention to provide a novel damping means for relatively swinging components such as, for example, the stationary core and moving coil-frame of a galvanometer or other similar types of electrical reading instruments.

It is another object of the present invention to provide an instrument of the type stated having damping means that does not require added weight or inertia on the moving element.

It is another object of the present invention to provide an instrument of the type stated having damping means which does not involve mechanical friction or mechanical limits.

It is also an object of the present invention to provide an instrument of the type stated in which the moving element has means for both axial and torsional damping.

It is a further object of the present invention to provide an electrical meter of the type stated having means for integrating pulsed meter input currents so that average stable indicated readings may be taken.

It is an additional object of the present invention to provide a damping means on a meter of the type stated that is economical in cost and rigid and sturdy in construction.

With the above and other objects in view, my invention resides in the novel features of form, construction, arrangement, and combination of parts presently described and pointed out in the claims.

In the accompanying drawings (two sheets)—

FIG. 5 is a fragmentary sectional view taken along line 5—5 of FIG. 2;

FIG. 6 is a vertical sectional view of a modified form of galvanometer also constructed in accordance with and embodying the present invention;

FIG. 7 is a fragmentary sectional view taken along line 7—7 of FIG. 6; and

Figure 1:
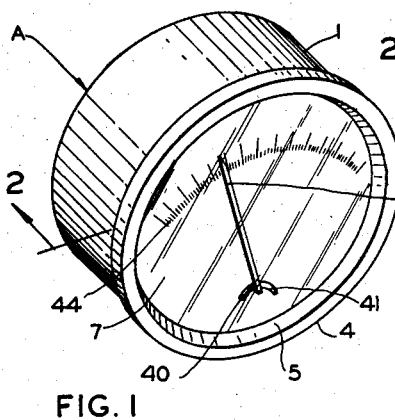
FIG. 1 is a perspective view of a galvanometer constructed in accordance with and embodying the present invention.
Figure 2:
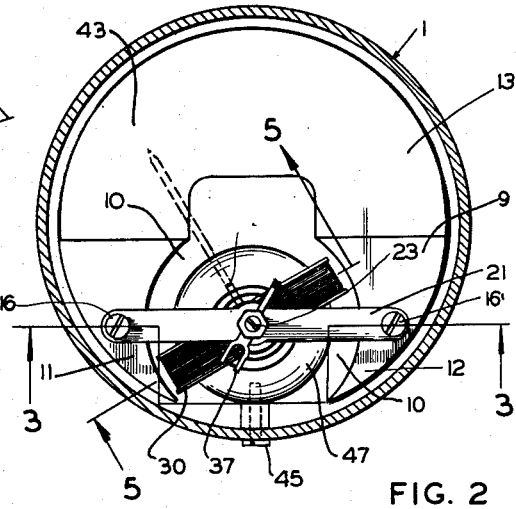
FIG. 2 is a sectional view taken along line 2—2 of FIG. 1.
Figure 3:
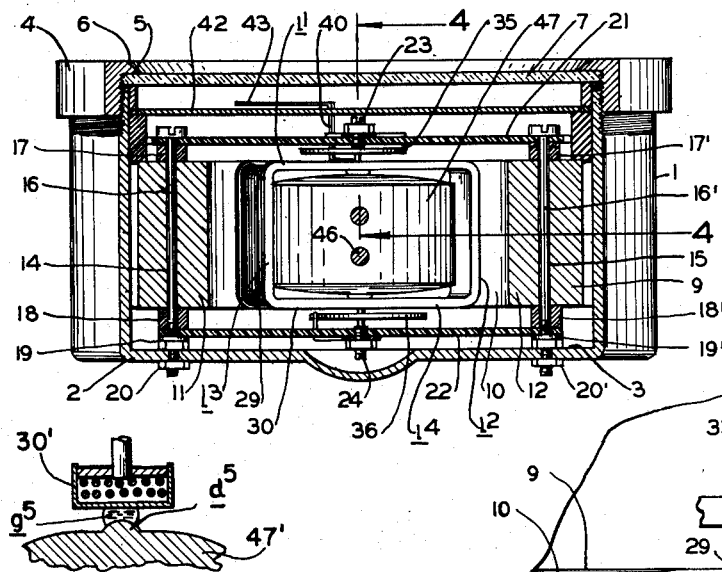
FIG. 3 is a sectional view taken along line 3—3 of FIG. 2.

Referring now in more detail and by reference characters to the drawings, which illustrate practical embodiments of the present invention, A designates a galvanometer comprising an open-topped cylindrical metal housing 1 integrally including a flat rear wall 2 having a forwardly presented face 3. Threadedly mounted on, and across, the open front of the tubular housing 1 is a cover plate 4 having an enlarged circular aperture 5 bordered by an inwardly extending flange 6. Extending closurewise across the aperture 5 between the housing 1 and the flange 6 is a transparent glass plate 7, which bears peripherally against a sealing ring interposed between the plate 7 and forward edge of the housing 1.

Provided for disposition within the housing 1 is a permanent magnet 9 having a substantially cylindrical gap 10 which, in effect, subdivides the magnet 9 into opposed poles 11, 12 connected by a magnetic yoke 13. The poles 11, 12 are provided with holes 14, 15 for accommodating elongated mounting bolts 16, 16', which also extend through spacer-sleeves 17, 18, 19, and 17', 18', 19', respectively, and through apertures in the bottom wall 2 for securement by nuts 20, 20'. By this means, the magnet 9 is rigidly mounted in properly spaced position within the housing 1. Also supported at its opposite ends between the heads of the bolts 16, 16' and the spacer-sleeves 17, 17' is a non-magnetic support-bar 21 which extends diametrically across the gap 10 in forwardly spaced relation to the forward face of the magnet 9. Similarly supported at its opposite ends between the spacer-sleeves 18, 19 and 18', 19' is a non-magnetic support-bar 22 which also extends diametrically across the gap 10 in rearwardly spaced relation to the rear face of the magnet 9 and in parallel registration with the support-bar 21. Mounted in the supports-bars 21, 22, in alignment with the central axis of the gap 10 are journal screws 23, 24, each provided with axially aligned jeweled bearings 25, 26, and held in endwise adjustment by lock-nuts 27, 28, respectively.

Rotatably mounted in the jeweled bearings 25, 26 is a loop-shaped coil 29 wound upon a substantially rectangular coil-form 30 integrally including channel-shaped frame-legs $l^1$, $l^2$, $l^3$, $l^4$, and being supported by two pivot pins 31, 32 having tapered points 33, 34 for disposition in the bearings 25, 26. The coil 20 is normally biased to a standard zero setting position by the action of two counterbalancing coil springs 35, 36, which are fastened at their inner ends to the pivot pins 31, 32, respectively, and attached at their outer ends to adjustment yokes 37, 38, respectively, which are adjustably secured upon the journal screws 23, 24 by the lock-nuts 27, 28. The coil 29 is also conventionally provided with pigtail conductors $t^1$, $t^2$, by which it is connected to the current-source to be measured. Centrally of their interior faces, the frame-legs are provided with inwardly presented arcuate dimples $d^1$, $d^2$, which are respectively coaxial with the pivot pins 31, 32. If desired, the jeweled bearings 25, 26 can be set into cushioning springs or shock-mounts which are conventional and, therefore, are not shown.

Rigidly secured to the forward leg $l^1$ of the coil-form 30 and extending radially therefrom is an arm 39 integrally provided at its outer end with an offset bend 40 projecting forwardly through an arcuate slot 41 formed in a dial-plate 42 mounted across the housing 1 in rearwardly spaced close proximity to the glass plate 7. At its forward end, the offset-bend 40 is integrally provided with a needle or pointer 43 which moves across a conventional scale 44 imprinted upon the face of the dial-plate 42.

Supported from the cylindrical side-wall of the housing 1 by means of screws 45, 46 is a cylindrical magnetic core 47 which fits loosely with the coil-form 30 and is substantially coaxial with the gap 10. The forward and rearward end faces 48, 49 of the core 47 are arcuately crowned and the central areas thereof are located in close proximity to the dimples $d^1$, $d^2$, and, in the intervening spaces, are small discrete globules $g^1$, $g^2$ of a non-hygroscopic viscous liquid, such as a silicone polymer or other similar material which has a substantially stable viscosity over wide ranges of temperature.

In use, the coil 29 is energized through the pigtail connectors $t^1$, $t^2$ in the usual manner and the flux generated therein will interact with the magnetic flux across the gap 10 to produce a corresponding deflection of the coil 29 and the needle 43 which moves with the coil 29. In this respect, the galvanometer A operates in the usual manner. However, the rate of swing is very effectively damped by the globules $g^1$, $g^2$, so that the coil will reach its indicative position precisely and with very little, if any, overswing or "hunting."

Obviously, the degree of damping effect can be varied by selecting a liquid of higher or lower viscosity. A liquid of high viscosity will introduce a relatively high degree of damping effect and, correspondingly, a liquid of low viscosity will introduce a low degree of damping effect. Moreover, it has been found in connection with the present invention that when the intervening spaces between the end faces 48, 49 of the core 47 and the dimples $d^1$, $d^2$ is of the order of ten to twenty thousandths of an inch, the globules $g^1$, $g^2$ will be held in coaxial alignment with the pivot pins 31, 32, by capillarity. Under such conditions, the globules $g^1$, $g^2$ will remain in such position, notwithstanding shocks, vibration, or change in position of the galvanometer A. In fact, the globules $g^1$, $g^2$ will even remain in position under rather severe centrifugal and gravitational forces. The globules $g^1$, $g^2$ effectively damp both torsional and axial movement of the coil 29 and the damping force exerted by the globules is substantially constant at all times over all ranges of movement. It does not vary significantly in proportion to the speed or the degree of deflectional movement.

It is also possible to provide a modified form of galvanometer B which is illustrated in FIGS. 6 and 7 and is, in many respects, similar to the previously described galvanometer A. The galvanometer B comprises a housing 1' and a permanent magnet 9' having a cylindrical gap 10' and being held in place within the housing 1' by means of mounting bolts 50, 50' and spacer-sleeves 51, 52, 53, 51', 52', 53'. Supported at their ends by means of the bolts 50, 50' and spacer-sleeves 51, 52, 53, 51', 52', 53' are dielectric support-bars 54, 55, which are substantially similar to the previously described support-bars 21, 22, and extend diametrally across the gap 10' in outwardly spaced relation to the opposite faces of the magnet 9'.

Theadedly mounted in and extending through the support-bar 54 in coaxial relationship to the cylindrical gap 10' is a journal cup 56 integrally including an externally threaded quill 57, a dish-shaped or concave bottom wall 58, and a cylindrical flange 59. Similarly mounted in the other support-bar 55 is a journal cup 60 which is also in coaxial alignment with the cylindrical gap 10' and integrally comprises an externally threaded quill 61, a dish-shaped or concave bottom wall 62, and a cylindrical flange 63. Seated within the journal cups 56, 60 are two identical flat washer-springs 64, 65 having central portions which are respectively located in coaxial alignment with the quills 57, 61, and are capable of deflection in the axial direction.

Operatively disposed within the cylindrical gap 10' is a coil 66 which is wound upon a rectangular coil-form 67 integrally including four channel-shaped legs $l^5$, $l^6$, $l^7$, $l^8$. The coil 66 and coil-form 67 are rotatably suspended within the cylindrical gap 10' by means of flat ribbons or so-called taut bands 68, 69 formed preferably of Phosphor bronze or some other similar spring-forming material capable of torsional deflection. As will be seen by reference to FIG. 6, the taut bands 68, 69 extend along the axial line of the cylindrical gap 10' and are rigidly attached at their inner ends to the legs $l^5$, $l^7$ of the coil-form 67 and, at their opposite ends, to the central deflecting areas of the washer-springs 64, 65. On their inwardly presented faces, the legs $l^5$, $l^7$ of the coil-form 67 are provided with dimples $d^3$, $d^4$, which are located in coaxial alignment with the taut bands 68, 69, and are substantially similar in configuration and function to the previously described dimples $d^1$, $d^2$.

Rigidly supported from the housing 1' and extending into the cylindrical gap 10' for loose-fitting disposition within the coil-form 67 is a cylindrical core 70 having arcuately crowned end faces 71, 72, the outermost portions of which are in opposed closely spaced relation to the dimples $d^3$, $d^4$. In the intervening space between the end faces 71, 72 and the dimples $d^3$, $d^4$ are discrete globules $g^3$, $g^4$ of a viscous damping liquid which are similar in purpose and function to the previously described globules $g^1$, $g^2$.

Figure 8:
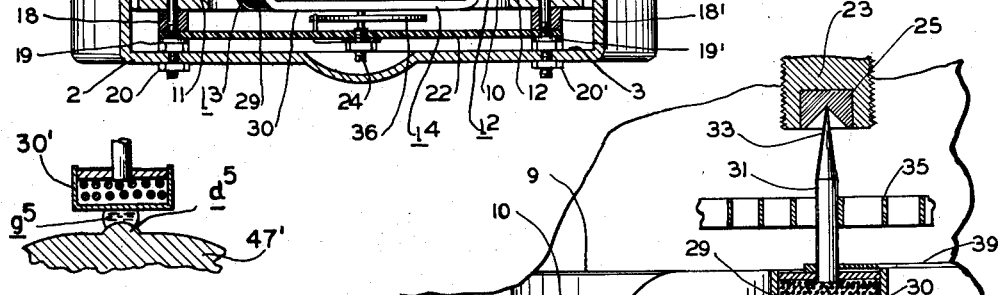
FIG. 8 is a fragmentary sectional view of a further modified form of galvanometer embodying the present invention.
Figure 4:
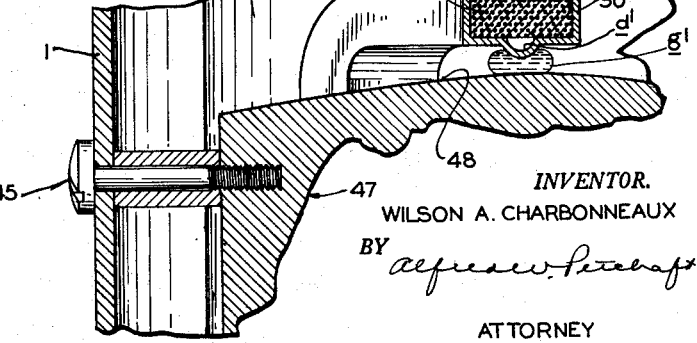
FIG. 4 is a fragmentary sectional view taken along line 4—4 of FIG. 3.

It is also possible to provide a further modified form of galvanometer A', as shown in FIG. 8, which is substantially similar to the previously described galvanometer A, except that the galvanometer A' has a magnetic core 47' which is axially provided with arcuate protuberances $d^5$ and a coil-form 30' having a flat underface. Held by capillarity between the protuberances $d^5$ and the coil-form 30' are globules $g^5$ which act as damping agents and are substantially similar to the previously described globules $g^1$, $g^2$. Other similar variations may also be employed, the important factor being that the axial space between the coil or coil-form and the core or other comparable stationary element decreases inwardly toward the axis of rotation, as exemplified by the dimples $d^1$, $d^2$, $d^3$, $d^4$, and $d^5$, for instance. The degree of curvature or decrease in spatial distance, of course, may be varied in accordance with the viscosity of the particular damping liquid selected.

It should be understood that changes and modifications in the form, construction, arrangement, and combination of the several parts of the galvanometers may be made and substituted for those herein shown and described without departing from the nature and principle of my invention.

Having thus described my invention, what I claim and desire to secure by Letters Patent is:

1. A galvanometer of the type described, said galvanometer comprising a magnet creating a magnetic field, a movable electrical coil rotatably mounted in said magnetic field for rotation when energized and having a central aperture, a core mounted within the aperture of said coil, and a discrete liquid globule located along the axis of rotation of the movable coil and being operatively interposed between the movable coil and said core for damping the movement of the coil when said coil is electrically energized.

2. A galvanometer of the type described, said galvanometer comprising a magnet creating a magnetic field, a movable electrical coil rotatably mounted in said magnetic field for rotation about a selected axis, said coil having an open interior region which is accessible from a point exterior to said coil, a core mounted within the interior region of said coil and supported by means exterior to said coil, and a discrete liquid globule located along said axis of the coil and being operatively interposed between said coil and said core for damping the movement of said coil with respect to said core.

3. A galvanometer as defined in claim 3, in which the liquid forming the discrete globule is a non-hygroscopic viscous liquid.

4. A galvanometer as defined in claim 3, in which the liquid forming the liquid globule is a silicone polymer liquid.

5. A galvanometer of the type described, said galvanometer comprising a housing, a magnet mounted within said housing and creating a magnetic field therein, a movable electrical coil rotatably mounted in said magnetic field for rotation about a predetermined axis, said coil having an interior open space that is accessible from a point exterior to said coil, said coil further having a surface which is presented inwardly toward said open space, a core mounted within said interior open space by means exterior to said coil, said core having an outwardly presented surface disposed in close proximate relation to said inwardly presented surface of the coil along said axis, and a discrete liquid globule interposed between said inwardly and said outwardly presented surfaces at the region of proximity therebetween along said axis.

6. A galvanometer of the type described, said galvanometer comprising a housing, a magnet mounted within said housing and creating a magnetic field therein, a movable rectangular coil integrally including four channel shaped frame legs and defining a central aperture, a pivot pin mounted in each of two leg frames for rotatably mounting said coil in said magnetic field, an inwardly concave dimple formed on the inwardly presented face of each of two said leg frames, a core mounted within the aperture of said coil, said core having arcuately crowned outwardly presented lateral side faces disposed in parallel relation to said inwardly presented faces, and fluid damping means interposed between said dimples and said arcuately crowned outwardly presented side faces for damping the movement of said coil.

7. A galvanometer of the type described, said galvanometer comprising a housing, a magnet mounted within said housing and creating a magnetic field therein, a movable rectangular coil integrally including four channel shaped frame legs and defining a central aperture, a pivot pin mounted in each of two leg frames for rotatably mounting said coil in said magnetic field, an inwardly concave dimple formed on the inwardly presented face of each of two said leg frames in coaxial alignment with said pivot pins, a core mounted within the aperture of said coil, said core having arcuately crowned outwardly presented lateral side faces disposed in parallel relation to said inwardly presented faces, and fluid damping means interposed between said dimples and said arcuately crowned outwardly presented side faces for damping the movement of said coil.

8. A galvanometer of the type described, said galvanometer comprising a housing, a magnet mounted within said housing and creating a magnetic field therein, a movable rectangular coil integrally including four channel shaped frame legs and defining a central aperture, a pivot pin mounted in each of two leg frames for rotatably mounting said coil in said magnetic field, an inwardly concave dimple formed on the inwardly presented face of each of two said leg frames, a core mounted within the aperture of said coil, said core having arcuately crowned outwardly presented lateral side faces disposed in parallel relation to said inwardly presented faces, and discrete globules of a liquid interposed between said dimples and said arcuately crowned outwardly presented side faces for damping the movement of said coil.

9. A galvanometer of the type described, said galvanometer comprising a housing, a magnet mounted within said housing and creating a magnetic field therein, a movable rectangular coil integrally including four channel shaped frame legs and defining a central aperture, a pivot pin mounted in each of two leg frames for rotatably mounting said coil in said magnetic field, an inwardly concave dimple formed on the inwardly presented face of each of two said leg frames, a core mounted within the aperture of said coil, said core having arcuately crowned outwardly presented lateral side faces disposed in parallel relation to said inwardly presented faces, and discrete globules of a non-hygroscopic viscous liquid interposed between said dimples and said arcuately crowned outwardly presented side faces for damping the movement of said coil.

10. A galvanometer of the type described, said galvanometer comprising a housing, a magnet mounted within said housing and creating a magnetic field therein, a movable rectangular coil integrally including four channel shaped frame legs and defining a central aperture, a pivot pin mounted in each of two leg frames for rotatably mounting said coil in said magnetic field, an inwardly concave dimple formed on the inwardly presented face of each of two said leg frames, a core mounted within the aperture of said coil, said core having arcuately crowned outwardly presented lateral side faces disposed in parallel relation to said inwardly presented faces, and discrete globules of silicone polymer interposed between said dimples and said arcuately crowned outwardly presented side faces for damping the movement of said coil.

11. A galvanometer according to claim 5 and further characterized in that the space between the proximate surfaces of core and movable coil in the region of the axis about which such coil rotates decreases progressively toward such axis, such space, at the axis, being of capillary dimension whereby the liquid interposed in such space is held therein by capillarity.

12. A galvanometer according to claim 5 in which the core is crowned outwardly toward the coil in the region of the axis of rotation of said coil to provide said outwardly presented surface so that the space between the coil and the outwardly presented surface of the core progressively decreases toward said axis, the space between said crowned portion and coil at the axis being of capillary dimension.

13. A galvanometer according to claim 5 in which the outwardly presented surface of the core is formed by a projecting protuberance around the area coincident with the axial line of rotation of the coil.

14. A galvanometer according to claim 5 further characterized in that said coil is wound upon a coil-form which surrounds said core in spaced relation thereto and in which said inwardly presented surface is formed by inwardly projecting dimples which progressively narrow the space between the coil-form so that the distance between the coil-form and core along said line of axial rotation is of capillary dimension.

References Cited in the file of this patent

UNITED STATES PATENTS

| | | |
|---|---|---|
| 2,596,019 | Fisher | May 6, 1952 |
| 2,623,083 | Schlumberger | Dec. 23, 1952 |